United States Patent
Hong (10) Patent No.: US 12,499,154 B2
(45) Date of Patent: Dec. 16, 2025

(54) METHOD, ELECTRONIC APPARATUS, AND STORAGE MEDIUM FOR GENERATING ENTITY INFORMATION GRAPH

(71) Applicant: Beijing Hydrophis Network Technology Co., Ltd., Beijing (CN)

(72) Inventor: Feng Hong, Beijing (CN)

(73) Assignee: Beijing Hydrophis Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/599,595

(22) Filed: Mar. 8, 2024

(65) Prior Publication Data
US 2024/0386055 A1      Nov. 21, 2024

(30) Foreign Application Priority Data

May 15, 2023   (CN) .......................... 202310546592.6

(51) Int. Cl.
| G06F 16/901 | (2019.01) |
| G06F 16/28 | (2019.01) |
| G06F 40/279 | (2020.01) |
| G06N 5/022 | (2023.01) |

(52) U.S. Cl.
CPC ........ *G06F 16/9024* (2019.01); *G06F 16/285* (2019.01); *G06F 16/288* (2019.01); *G06F 40/279* (2020.01); *G06N 5/022* (2013.01)

(58) Field of Classification Search
CPC .. G06F 16/9024; G06F 16/285; G06F 16/288; G06F 40/279; G06N 5/022
See application file for complete search history.

(56) References Cited

U.S. PATENT DOCUMENTS

| 11,423,082 | B2 * | 8/2022 | Vikhe | ............... G06F 16/24578 |
| 2020/0342954 | A1 * | 10/2020 | Ul Ain | .................... G16B 40/00 |
| 2021/0081717 | A1 * | 3/2021 | Creed | .................... G06N 3/047 |

(Continued)

OTHER PUBLICATIONS

Du et al. "Graph Neural Network-Based Entity Extraction and Relationship Reasoning in Complex Knowledge Graphs", 2024, https://arxiv.org/pdf/2411.15195 (Year: 2024).*

(Continued)

*Primary Examiner* — Matthew J Ellis (57) ABSTRACT

The present disclosure relates to information graph generation technology, and discloses a method, an electronic apparatus, and a storage medium for generating an entity information graph. The method includes: acquiring entity information data, and performing information extraction on the entity information data to obtain a triplet; performing information fusion on the triplet to obtain fused information, and constructing a scoring function and a loss function according to the fused information; constructing an initial information graph based on the scoring function and the loss function using the fused information, and performing link prediction on the initial information graph; and updating the initial information graph based on a result of the link prediction to obtain an entity information graph. The present disclosure can mine valuable information data from massive information sources, convert unstructured information data into structured data, and generate an information graph with logical relationships based on the structured data.

17 Claims, 4 Drawing Sheets

(56) References Cited

U.S. PATENT DOCUMENTS

| | | | |
|---|---|---|---|
| 2022/0156582 A1* | 5/2022 | Sengupta | G06N 3/042 |
| 2022/0383140 A1* | 12/2022 | Lin | G06F 17/18 |
| 2023/0169358 A1* | 6/2023 | Zayats | G06N 20/00 |
| | | | 706/55 |

OTHER PUBLICATIONS

Du et al. "Graph Neural Network-Based Entity Extraction and Relationship Reasoning in Complex Knowledge Graphs", 2024, https://arxiv.org/pdf/2411.15195.*

* cited by examiner

METHOD, ELECTRONIC APPARATUS, AND STORAGE MEDIUM FOR GENERATING ENTITY INFORMATION GRAPH

CROSS REFERENCE TO RELATED APPLICATIONS

The present application claims the benefit of Chinese Patent Application No. 202310546592.6 filed on May 15, 2023, the contents of which are incorporated herein by reference in their entirety.

TECHNICAL FIELD

The present disclosure relates to the field of information graph generation technology, and more particularly to a method, an electronic apparatus, and a storage medium for generating an entity information graph.

BACKGROUND

An information graph is a semantic network diagram formed by various entities, concepts, and relationships that exist in the real world. The information graph is used to formally describe various things and corresponding relationships in the real world. The essence of the information graph is to strengthen the connection between different data sources and use an ontology model to normalize the data, which is conducive to mining the implicit semantics of the data. However, there are two obvious problems in the construction of information graphs in traditional methods: first, there is no unified representation system for the information graph, and specific information depends entirely on the interpretation form of the processing program; since reasoning cannot guarantee a high accuracy and may be logically insufficient, thus, ambiguity cannot be eliminated; second, due to the large amount of information, the relationships between entities are numerous and complex, which may lead to incomplete information when the information graph is constructed. Therefore, how to mine valuable information data from massive information sources, convert unstructured information data into structured data, and generate an information graph with logical relationships based on structured data has become an urgent problem to be solved.

SUMMARY

The present disclosure provides a method, device, electronic apparatus, and storage medium for generating an entity information graph, aiming to solve the problem of how to mine valuable information data from massive information sources and generate information graphs with logical relationships.

In order to achieve the aforementioned purpose, the method for generating an entity information graph provided in the present disclosure includes:
acquiring entity information data, and performing information extraction on the entity information data to obtain a triplet;
performing information fusion on the triplet to obtain fused information, and constructing a scoring function and a loss function according to the fused information;
constructing an initial information graph based on the scoring function and the loss function using the fused information, and performing link prediction on the initial information graph; and
updating the initial information graph based on a result of the link prediction to obtain an entity information graph.

In an embodiment, the performing information extraction on the entity information data to obtain a triplet includes:
structuring the entity information data to obtain structured data;
performing word segmentation on the structured data to obtain an information word;
classifying the information word to obtain a word segmentation category;
performing an association analysis on the word segmentation category and the information word, and determining an association relationship between the word segmentation category and the information word according to a result of the association analysis; and
generating the triplet according to the information word, the association relationship, and the word segmentation category.

In an embodiment, the performing information fusion on the triplet to obtain fused information includes:
performing feature extraction on the triplet to obtain a triplet feature;
splicing a plurality of the triplet features to obtain a spliced feature; and
aggregating the spliced feature to obtain an aggregated feature, and determining the fused information according to the aggregated feature.

In an embodiment, the aggregating the spliced feature to obtain an aggregated feature includes:
normalizing the spliced feature to obtain normalized features;
calculating the normalized features and the spliced feature to obtain the aggregated feature using the following formula:

$$A = \frac{1}{|C_i|} \sum_{i=1}^{I} B_i$$

wherein, A represents the aggregated feature, $B_i$ represents an i-th spliced feature, $C_i$ represents the normalized feature corresponding to the i-th spliced feature, I represents a total number of the spliced feature.

In an embodiment, the constructing a scoring function and a loss function based on the fused information includes:
randomly selecting two candidate information pieces from the fused information as target information pieces, calculating a similarity between the target information pieces, and obtaining an information association relationship between the target information pieces based on the similarity;
performing feature extraction on the target information pieces to obtain target features, and performing mapping processing on the target features to obtain a mapping matrix;
generating the scoring function according to the similarity, the information association relationship, and the mapping matrix:

$$D = \frac{\exp(E_j \times \tanh(e+r) + \tanh(E_j \times e) + b)}{\sum_{j=1}^{J} \exp(E_j \times \tanh(e+r) + \tanh(E_j \times e) + b)}$$

wherein, D represents a score calculated by the scoring function, $E_j$ represents a j-th mapping matrix, erepresents the similarity, r represents the information association relationship, J represents a total number of the mapping matrix, b represents a preset calculation parameter, tanh represents an activation function, exp represents an exponential function;

generating the loss function according to the target features and the scoring function:

$$L = -\frac{l(F_f = 1)}{\sum_f l(F_f = 1)} lbD$$

wherein, L represents a loss value calculated by the loss function, $F_f$ represents a f-th target feature, D represents the score calculated by the scoring function, and when an equation in the parentheses of $l(\cdot)$ is true, then $l(\cdot)=1$, otherwise, $l(\cdot)=0$.

In an embodiment, the constructing an initial information graph using the fused information based on the scoring function and the loss function includes:

acquiring a data structure of the fused information, performing standardization on the data structure to obtain a standard structure, and updating the fused information using the standard structure to obtain updated fused information;

scoring the updated fused information according to the scoring function to obtain an information score, and sorting the updated fused information according to the information score to obtain an information sequence;

generating a knowledge base according to the updated fused information and the information sequence, and calculating a loss value of the knowledge base according to the loss function;

correcting the knowledge base based on the loss value to obtain a corrected knowledge base; and acquiring a target association relationship between the updated fused information, and generating the initial information graph based on the target association relationship and the corrected knowledge base.

In an embodiment, the performing link prediction on the initial information graph includes:

acquiring associated entities between the updated fused information in the initial information graph, and determining whether there is an association relationship between the associated entities;

when there is an association relationship between the associated entities, determining that the initial information graph is a normal information graph; and when there is no association relationship between the associated entities, determining that the initial information graph is an abnormal information graph.

The present disclosure further provides a device for generating an entity information graph, including:

a triplet generation module, configured to obtain entity information data, perform information extraction on the entity information data, and obtain a triplet;

a function construction module, configured to perform information fusion on the triplet to obtain fused information and construct a scoring function and a loss function based on the fused information;

a link prediction module, configured to construct an initial information graph based on the scoring function and the loss function using the fused information, and perform link prediction on the initial information graph;

an entity information graph generation module, configured to update the initial information graph according to a result of the link prediction to obtain an entity information graph.

The present disclosure further provides an electronic apparatus, including at least one processor and a memory in communication with the at least one processor, wherein the memory stores a computer program executable on the at least one processor, and the computer program is executed by the at least one processor to enable the at least one processor to execute the above method for generating an entity information graph.

The present disclosure further provides a computer-readable storage medium storing a computer program, which, when being executed by a processor, implements the above method for generating an entity information graph.

In the embodiment of the present disclosure, unstructured entity information data can be converted into structured triples by extracting information from the entity information data, thereby ensuring the accuracy and uniformity of the data. By fusing the triples, the obtained fused information can be more complete. By constructing the initial information graph based on the scoring function, the loss function, and the fused information, the accuracy of the initial information graph can be ensured. By performing link prediction on the initial information graph and updating the initial information graph based on the result of the link prediction, the obtained entity information graph can be more accurate and can accurately reflect the internal relationships between information. Therefore, the method for generating an entity information graph provided in the present disclosure can solve the problem of how to mine valuable information data from massive information sources and generate an information graph with logical relationships.

The realization of the objectives, functional features, and advantages of the present disclosure will be further explained with reference to the accompanying drawings in conjunction with the embodiments.

DETAILED DESCRIPTION OF THE EMBODIMENTS

In the following, the technical solutions in the embodiments of the present disclosure will be clearly and completely described with reference to the drawings in the embodiments of the present disclosure. Obviously, the described embodiments may be only a part of the embodiments of the present disclosure, but not all of the embodiments. Based on the embodiments of the present disclosure, all other embodiments obtained by those of ordinary skilled in the art without creative effort shall fall within the protection scope of the present disclosure.

The embodiments of the present disclosure provide a method for generating an entity information graph. The method can be executed by, but is not limited to, at least one of electronic devices such as servers and terminals that are configured to perform the method provided by the embodiments of the present disclosure. In other words, the method for generating entity information graphs can be executed by software or hardware installed on terminal devices or server devices. The software can be a blockchain platform. The server includes, but is not limited to, a single server, a server cluster, a cloud server, or a cloud server cluster. The server can be an independent server, or a cloud server that provides basic cloud computing services such as cloud services, cloud databases, cloud computing, cloud functions, cloud storage, network services, cloud communication, middleware services, domain name services, security services, content delivery networks (CDNs), and big data and artificial intelligence platforms.

Figure 1:
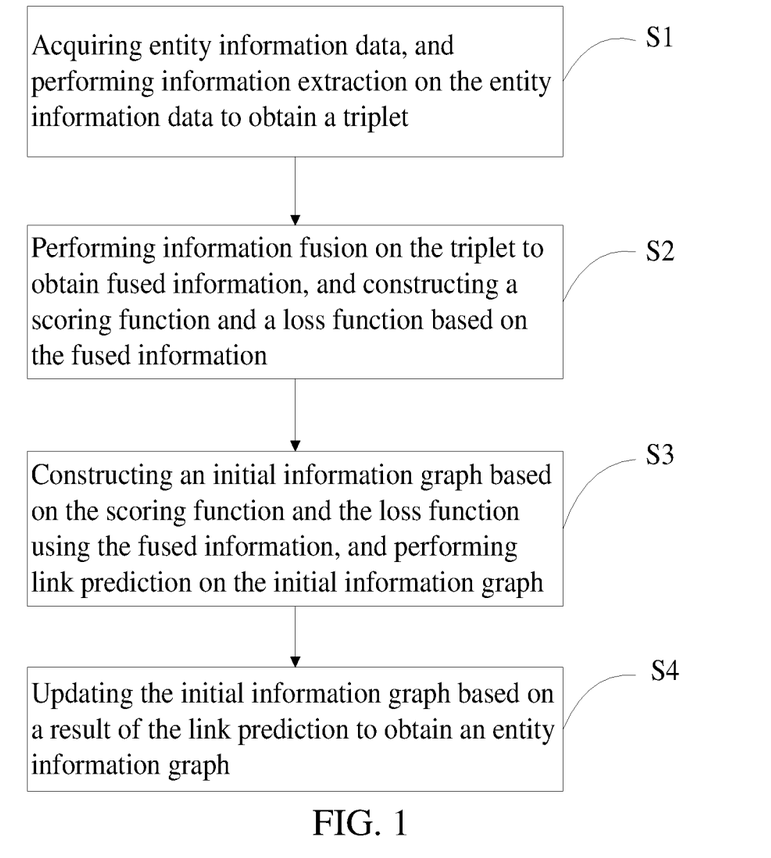
FIG. 1 is a flowchart of a method for generating an entity information graph in accordance with an embodiment of the present disclosure.

Referring to FIG. 1, which is a flow diagram of the method for generating an entity information graph in accordance with an embodiment of the present disclosure, the method includes steps as follows.

S1, acquiring entity information data, and performing information extraction on the entity information data to obtain a triplet.

In the embodiment of the present disclosure, the entity information data includes information data contained in text files, wherein the information data includes background information, registered capital, number of insured persons, operating status, historical risks, and so on.

In the embodiment of the present disclosure, the performing information extraction on the entity information data to obtain a triplet includes:

structuring the entity information data to obtain structured data;
performing word segmentation on the structured data to obtain an information word;
classifying the information word to obtain a word segmentation category;
performing an association analysis on the word segmentation category and the information word, and determining an association relationship between the word segmentation category and the information word according to a result of the association analysis; and
generating the triplet according to the information word, the association relationship, and the word segmentation category.

In the embodiment of the present disclosure, structuring the entity information data refers to data cleaning, that is, incomplete, erroneous, and duplicate data is deleted from the entity information data, thereby reducing redundancy in the entity information data and obtaining cleaned data. The cleaned data can be labeled with a part of speech using a hidden Markov model to obtain labeled data, which can be used as the structured data.

In the embodiment of the present disclosure, a preset word segmenter can be used to segment the structured data. The word segmenter can be a Jieba Chinese word segmenter. A K-NN classification algorithm can be used to classify the information word to obtain the word segmentation category.

An association analysis or regression analysis method is used to analyze an association between the word segmentation category and the information word, and determine whether there is a association between the word segmentation category and the information word. When there is an association between the word segmentation category and the information word, the word segmentation category and the information word are classified according to a level of the association. For example, the association is divided into three levels: strong association, weak association, and no association, and a value is assigned to the level of the association such that an association value is obtained. Thus, the information word, the association relationship, and the word segmentation category are spliced together to obtain a triplet of information word-word segmentation category-association value.

S2, performing information fusion on the triplet to obtain fused information, and constructing a scoring function and a loss function based on the fused information.

Figure 2:
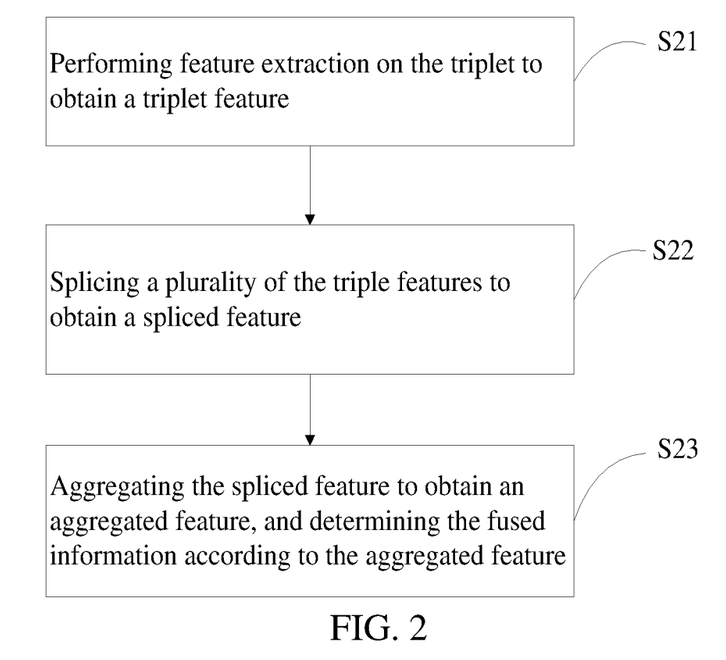
FIG. 2 is a flowchart of a step of performing information fusion on a triplet to obtain fused information in accordance with an embodiment of the present disclosure.

Referring to FIG. 2, in the embodiment of the present disclosure, the performing information fusion on the triplet to obtain fused information includes:

S21, performing feature extraction on the triplet to obtain a triplet feature;
S22, splicing a plurality of the triplet features to obtain a spliced feature; and
S23, aggregating the spliced feature to obtain an aggregated feature, and determining the fused information according to the aggregated feature.

In the embodiment of the present disclosure, the triplet is passed through a convolution layer, a loss layer, and a multi-head self-attention layer of a neural network, that is, a convolution, a regularization, and an extraction of hidden information are performed to the triplet to obtain the triplet feature. An embedding dimension of the triplet feature is obtained, and the triplet features with the same embedding dimension are spliced to obtain the spliced feature. A total number of the spliced feature depends on the distribution of embedding dimensions of the triplet features and may vary with different input data. In other words, the total number of the spliced feature is the number of distinct embedding dimensions in the triplet feature. An i-th spliced feature is the collection of all triplet features sharing the i-th embedding dimension, merged into a higher-dimensional feature vector through splicing. For example, assuming that the triplet features have three different embedding dimensions (e.g., dimensions of 16, 32, 64), each embedding dimension corresponds to a spliced feature. Based on this, the total number of the spliced feature is 3, a first spliced feature is the splicing result of all triplet features with an embedding dimension of 16; a second concatenated feature is the splicing result of all triplet features with an embedding dimension of 32; and a third spliced feature is the splicing result of all triplet features with an embedding dimension of 64. Based on a multi-relation path aggregator, the spliced feature are aggregated using an aggregation algorithm to obtain the aggregated feature. Since the aggregated feature is generated by a relationship path, the aggregated feature is specific to semantics. Semantic information corresponding to a type of aggregated feature under a specific semantic is obtained and integrated to obtain the fused information.

In the embodiment of the present disclosure, the aggregating the spliced feature to obtain an aggregated feature includes:

normalizing the spliced feature to obtain normalized features; and calculating the normalized features and the spliced feature to obtain the aggregated feature.

In the embodiment of the present disclosure, the normalized features and the spliced feature are calculated to obtain the aggregated features using the following formula:

$$A = \frac{1}{|C_i|} \sum_{i=1}^{I} B_i$$

wherein, A represents the aggregated feature, $B_i$ represents an i-th spliced feature, $C_i$ represents the normalized feature corresponding to the i-th spliced feature, I represents a total number of the spliced feature.

Figure 3:
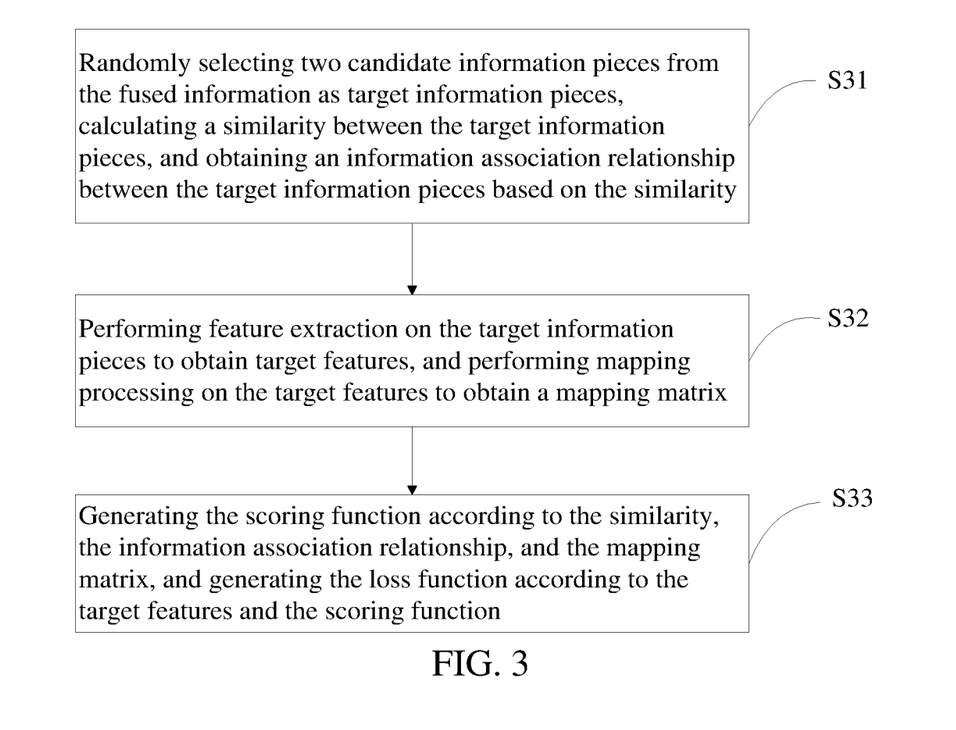
FIG. 3 is a flowchart of a step of constructing a scoring function and a loss function based on fused information in accordance with an embodiment of the present disclosure.

Referring to FIG. 3, in the embodiment of the present disclosure, the constructing a scoring function and a loss function based on the fused information includes:

S31, randomly selecting two candidate information pieces from the fused information as target information pieces, calculating a similarity between the target information pieces, and obtaining an information association relationship between the target information pieces based on the similarity;

S32, performing feature extraction on the target information pieces to obtain target features, and performing mapping processing on the target features to obtain a mapping matrix; and S33, generating the scoring function according to the similarity, the information association relationship, and the mapping matrix, and generating the loss function according to the target features and the scoring function.

In the embodiment of the present disclosure, the target information pieces can be entities randomly selected from the fused information, for example, the target information pieces can be company employees, leaders, and company warehouses. A cosine similarity algorithm is used to calculate the similarity between the target information pieces, and whether there is an association between the target information pieces is determined based on the similarity. First, attributes of the target information pieces are obtained, and the similarity between the attributes of the target information pieces is calculated. Then, an integration analysis is performed based on the similarity to obtain the information association relationship between the target information pieces, such as superior-subordinate relationships. There are many identical or similar attributes between superiors and subordinates, such as location and work content.

In the embodiment of the present disclosure, convolution, pooling, and fully-connection are performed on the target information pieces using a preset neural network to obtain the target features corresponding to the target information pieces. A principal component analysis (PCA) method can be used to map the target features to obtain mapping vectors, calculate feature values of the mapping vectors, and generate a mapping matrix based on the mapping vectors and the feature values. In other words, the PCA method is used to perform mapping processing on the target feature (e.g., a n-dimensional feature) to obtain the mapping vector (e.g., a k-dimensional feature vector resulting from the mapping process), calculate the feature value of the mapping vector (e.g., a k-dimensional feature value corresponding to the k-dimensional feature vector), and generate the mapping matrix based on the mapping vector and the feature value, (the n-dimensional target feature corresponding to each target information piece has a mapping matrix, and the total number of the mapping matrix corresponds to the number of the target information piece).

In the embodiment of the present disclosure, the scoring function is expressed as:

$$D = \frac{\exp(E_j \times \tanh(e+r) + \tanh(E_j \times e) + b)}{\sum_{j=1}^{J} \exp(E_j \times \tanh(e+r) + \tanh(E_j \times e) + b)}$$

wherein, D represents a score calculated by the scoring function, $E_j$ represents a j-th mapping matrix, e represents the similarity, r represents the information association relationship, J represents a total number of the mapping matrix, b represents a preset calculation parameter, tanh represents an activation function, and exp represents an exponential function.

In the embodiment of the present disclosure, the loss function is expressed as:

$$L = -\frac{l(F_f = 1)}{\sum_f l(F_f = 1)} lbD$$

wherein, L represents a loss value calculated by the loss function, $F_f$ represents a f-th target feature, D represents the score calculated by the scoring function, and when an equation in the parentheses of l(·) is true, then l(·)=1, otherwise, I(·)=0.

S3, constructing an initial information graph based on the scoring function and the loss function using the fused information, and performing link prediction on the initial information graph.

In the embodiment of the present disclosure, the constructing an initial information graph using the fused information based on the scoring function and the loss function includes:
  acquiring a data structure of the fused information, performing standardization on the data structure to obtain a standard structure, and updating the fused information using the standard structure to obtain updated fused information;
  scoring the updated fused information according to the scoring function to obtain an information score, and sorting the updated fused information according to the information score to obtain an information sequence;
  generating a knowledge base according to the updated fused information and the information sequence, and calculating a loss value of the knowledge base according to the loss function;
  correcting the knowledge base based on the loss value to obtain a corrected knowledge base; and
  acquiring a target association relationship between the updated fused information, and generating the initial information graph based on the target association relationship and the corrected knowledge base.

In the embodiment of the present disclosure, the data structure refers to a set of data elements that have one or more specific relationships between each other. The data structure of the fused information is preset as a standard structure of entity-attribute-relationship, and all the data structures of the fused information are converted into the standard structure to obtain the updated fused information. The updated fused information is calculated using the scoring function, and the information scores obtained from the calculation are sorted in descending order to obtain the information sequence.

In the embodiment of the present disclosure, the information sequence is used as a column vector and the updated fused information is used as a row vector to establish a table, which is stored in a database. The database is used as the knowledge base. Based on the loss value, the information parameter in the updated fused information is adjusted to obtain adjusted correction information, which is used to replace the updated fused information in the knowledge base to achieve the update of the knowledge base and obtain the corrected knowledge base.

In the embodiment of the present disclosure, a preset association algorithm is used to calculate a level of the association between the updated fused information. The association algorithm can be the Apriori algorithm. Based on the level of the association, multiple attributes are found between the updated fused information with the level of the association greater than 80%. An attribute analysis is performed based on the multiple attributes to determine the target association relationship between the updated fused information. The initial information graph is constructed in the form of an association tree by using correlated attributes of the updated fused information in the corrected knowledge base as nodes and connecting the nodes between the updated fused information using the target association relationship.

In the embodiment of the present disclosure, the performing link prediction on the initial information graph includes:
acquiring associated entities between the updated fused information in the initial information graph, and determining whether there is an association relationship between the associated entities;
when there is an association relationship between the associated entities, determining that the initial information graph is a normal information graph; and
when there is no association relationship between the associated entities, determining that the initial information graph is an abnormal information graph.

In the embodiment of the present disclosure, the associated entity refers to the information word in the updated fused information. An associated table corresponding to the updated fused information is acquired, which includes the information word and multiple types corresponding to the information word. Two connected associated entities are randomly selected from the updated fused information as a first associated entity and a second associated entity, and a first type corresponding to the first associated entity and a second type corresponding to the second associated entity in the associated table are acquired. Whether the first type includes the second type or not is determined; when the first type includes the second type, it is determined that there is an association relationship between the two associated entities; when the first type does not include the second type, it is determined that there is no association relationship between the two associated entities. For example, if the association relationship is a superior-subordinate relationship, then the work address or the work content corresponding to the first associated entity include the work address or the work content corresponding to the second associated entity.

S4, updating the initial information graph based on a result of the link prediction to obtain an entity information graph.

In the embodiment of the present disclosure, when the result of the link prediction determines that the initial information graph is a complete information graph, there is no need to update the initial information graph, and the initial information graph is used as the entity information graph; when the result of the link prediction determines that the initial information graph is an abnormal information graph, a connection line between the associated entities in the updated fused information in the initial information graph is obtained, and the connection line is disconnected to update the initial information graph, such that the updated initial information graph is used as the entity information graph.

In the embodiment of the present disclosure, unstructured entity information data can be converted into structured triples by extracting information from the entity information data, thereby ensuring the accuracy and uniformity of the data. By fusing the triples, the obtained fused information can be more complete. By constructing the initial information graph based on the scoring function, the loss function, and the fused information, the accuracy of the initial information graph can be ensured. By performing link prediction on the initial information graph and updating the initial information graph based on the result of the link prediction, the obtained entity information graph can be more accurate and can accurately reflect the internal relationships between information. Therefore, the method for generating an entity information graph provided in the present disclosure can solve the problem of how to mine valuable information data from massive information sources and generate an information graph with logical relationships.

Figure 4:
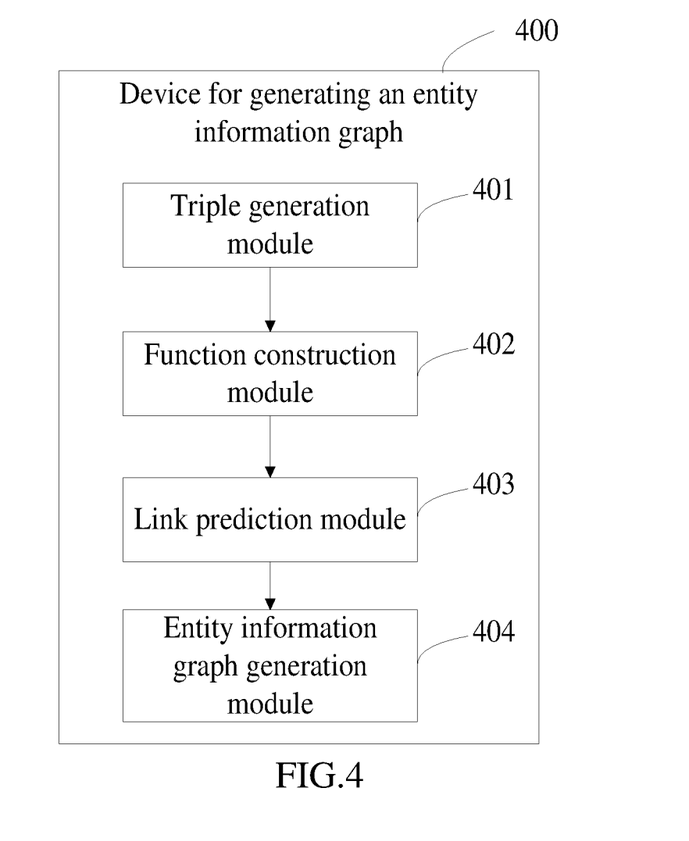
FIG. 4 is a functional module diagram of a device for generating an entity information graph in accordance with an embodiment of the present disclosure.

As shown in FIG. 4, which is a functional module diagram of a device for generating an entity information graph generation in accordance with an embodiment of the present disclosure, the device for generating an entity information graph 400 described in the present disclosure can be installed in an electronic apparatus. According to the functions to be implemented, the device for generating an entity information graph 400 may include a triplet generation module 401, a function construction module 402, a link prediction module 403, and an entity information graph generation module 404. The modules described in the present disclosure can also be referred to as units, which refer to a series of computer program segments that are stored in a memory of an electronic apparatus and can be executed by processor of the electronic apparatus and can complete fixed functions.

The triple generation module 401 is configured to obtain entity information data and perform information extraction on the entity information data to obtain a triple.

The function construction module 402 is configured to perform information fusion on the triplet to obtain fused information and construct a scoring function and a loss function based on the fused information.

The link prediction module 403 is configured to construct an initial information graph based on the scoring function and the loss function using the fused information, and perform link prediction on the initial information graph;

The entity information graph generation module 404 is configured to update the initial information graph based on a result of the link prediction to obtain an entity information graph.

In detail, the modules described in the device for generating an entity information graph 400 in the embodiment of the present disclosure adopt the same technical means as the method for generating an entity information graph described in the accompanying drawings when used, and can produce the same technical effects, which will not be repeated here.

Figure 5:
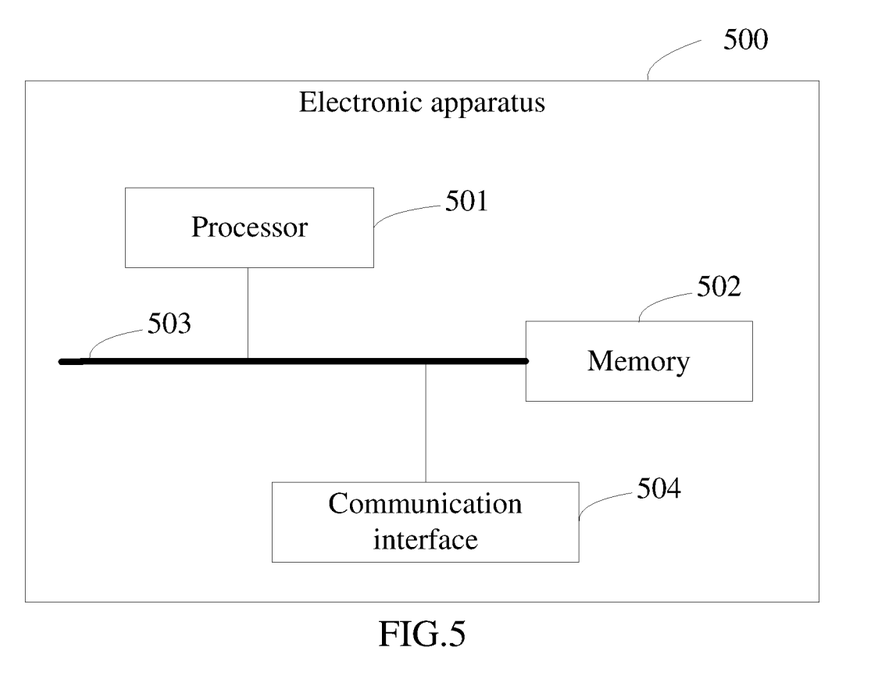
FIG. 5 is a structural diagram of an electronic apparatus for implementing the method for generating an entity information graph in accordance with an embodiment of the present disclosure.

As shown in FIG. 5, which is a structural diagram of an electronic apparatus for implementing the method of generating an entity information graph in accordance with an embodiment of the present disclosure, the electronic apparatus 500 may include a processor 501, a memory 502, a communication bus 503, and a communication interface 504. The electronic apparatus may also include computer programs stored in the memory 502 and executable on the processor 501, such as a program for generating an entity information graph.

The processor 501 may be composed of integrated circuits. For example, the processor 501 may be composed of a single integrated circuit, or may be composed of multiple integrated circuits of the same function or different functions. The processor 501 may include one or more central processing units (CPU), a microprocessor, a digital processing chip, a graphics processor, or a combination of various control chips. The processor 501 is the control unit of the electronic apparatus, which connects various components of the entire electronic apparatus using various interfaces and lines, and executes various functions and processes data by running or executing programs or modules (such as the program for generating an entity information graph) stored in the memory 502, and invoking data stored in the memory 502.

The memory 502 includes at least one type of readable storage medium, which includes a flash memory, a removable hard disk, a multimedia card, a card-type storage (such as SD or DX storage), a magnetic storage, a magnetic disk, and an optical disk. In some embodiments, the memory 502 can be an internal storage unit of the electronic apparatus, such as the removable hard disk of the electronic device. In other embodiments, the memory 502 can also be an external storage device of the electronic apparatus, such as a plug-in removable hard disk, a smart media card (SMC), a secure digital (SD) card, and a flash card. The memory 502 can also include both the internal storage unit and the external storage device of the electronic apparatus. The memory 502 can be used not only to store application software and various data installed in the electronic apparatus, such as codes of the program for generating an entity information graph, but also to temporarily store data that has been output or will be output.

The communication bus 503 may be a peripheral component interconnect (PCI) bus or an extended industry standard architecture (EISA) bus. The communication bus can include an address bus, a data bus, a control bus, etc. The communication bus is configured to realize the connection and communication between the memory 502 and at least one processor 501, etc.

The communication interface 504 is used for communication between the electronic apparatus and other devices, including network interfaces and user interfaces. Optionally, the network interfaces can include wired interfaces and/or wireless interfaces (such as WI-FI interfaces and Bluetooth interfaces), which are usually used to establish communication connections between the electronic apparatus and other electronic devices. The user interface can be a display, an input unit (such as a keyboard); optionally, the user interface can also be a standard wired interface or a wireless interface. In some embodiments, the display can be a light emitting diode (LED) display, a liquid crystal display, a touch-sensitive liquid crystal display, and an organic light emitting diode (OLED) touch screen. In this disclosure, the display can also be appropriately termed as a display screen or a display unit, which is used for displaying information processed in the electronic apparatus, and displaying a visual user interface.

FIG. 5 only shows the electronic apparatus with some components. Those skilled in the art can understand that the structure shown in FIG. 3 does not constitute a limitation on the electronic apparatus, and the electronic apparatus may include fewer or more components than those shown, or a combination of some components, or have different component arrangements.

For example, although not shown, the electronic apparatus may also include a power supply (such as a battery) that supplies power to various components. In some embodiments, the power supply may be logically connected to the at least one processor 501 through a power management device, thereby enabling charging management, discharging management, and power consumption management functions through the power management device. The power supply may also include one or more DC or AC power supplies, recharging devices, power failure detection circuits, power converters or inverters, power status indicators, and any other components. The electronic apparatus may also include various sensors, Bluetooth modules, Wi-Fi modules, etc., which is not further described here.

It should be understood that the embodiments described are for illustrative purposes only and are not limited by this structure in the scope of the present disclosure.

The program for generating an entity information graph stored in the memory 502 of the electronic apparatus 500 is a combination of multiple instructions, which when executed in the processor 501 can implement:

acquiring entity information data, and performing information extraction on the entity information data to obtain a triplet;

performing information fusion on the triplet to obtain fused information, and constructing a scoring function and a loss function according to the fused information;

constructing an initial information graph based on the scoring function and the loss function using the fused information, and performing link prediction on the initial information graph; and updating the initial information graph based on a result of the link prediction to obtain an entity information graph.

In an embodiment, the specific implementation method of the processor 501 for the above instructions can be referred to the description of the relevant steps in the corresponding embodiments of the attached drawings, which is not repeated here.

Further, if the module/unit integrated into the electronic apparatus is implemented in the form of a software functional unit and sold or used as an independent product, it can be stored in a computer-readable storage medium. The computer-readable storage medium can be volatile or non-volatile. For example, the computer-readable medium can include any entity or device capable of carrying the computer program code, recording medium, U disk, mobile hard disk, magnetic disk, optical disk, computer memory, read-only memory (ROM).

The present disclosure also provides a computer-readable storage medium storing a computer program, which, when being executed by a processor of an electronic device, can implement:

acquiring entity information data, and performing information extraction on the entity information data to obtain a triplet;

performing information fusion on the triplet to obtain fused information, and constructing a scoring function and a loss function according to the fused information;

constructing an initial information graph based on the scoring function and the loss function using the fused information, and performing link prediction on the initial information graph; and updating the initial information graph based on a result of the link prediction to obtain an entity information graph.

In the several embodiments provided by the present disclosure, it should be understood that the disclosed apparatus, device and method can be implemented in other ways. For example, the embodiments of the electronic device described above are only illustrative. For example, the division of modules is only a logical function division, and there may be other division methods in actual implementation.

The modules described as separate components may or may not be physically separated, and the components displayed as modules may or may not be physical units, that is, they may be located in one place or distributed across multiple network units. Some or all of the modules can be selected according to actual needs to achieve the objectives of this embodiment.

Additionally, various functional modules described in the embodiments herein may be integrated into one processing unit or may be present as a number of physically separated units, and two or more units may be integrated into one. The above integrated units may be implemented by hardware or by hardware in combination with software functional modules.

It will be appreciated that the foregoing embodiments are merely illustrative of the technical solutions of this disclosure and are not restrictive. Various modifications, changes, or equivalent substitutions can be made to the disclosure without departing from the spirit and scope of the technical solutions of the disclosure.

Therefore, from any point of view, the foregoing embodiments are to be regarded in all respects as illustrative and not restrictive, and the scope of the disclosure is defined by the appended claims rather than by the foregoing description. The present disclosure is therefore intended to embrace all changes that fall within the meanings and ranges of the equivalent elements of the claims. No reference sign shown in the accompanying drawings that are recited in a claim should be considered as a restriction on the claim involved.

The embodiments of the present disclosure can acquire and process relevant data based on artificial intelligence (AI) technology. Wherein, AI is a theory, method, technology, and application system that uses digital computers or machines controlled by digital computers to simulate, extend, and expand human intelligence, perceive the environment, acquire knowledge, and use knowledge to obtain the best results.

In addition, it is manifest that the term "comprising," or "including," does not exclude other elements or steps, and the singular form does not exclude the plural. A plurality of units or devices recited in the system claims may also be implemented by one unit or device through software or hardware. Terms such as "first," "second," (if any) are used to indicate names rather than any particular order.

Finally, it should be noted that the above embodiments are only used to illustrate the technical solutions of the present disclosure and are not limitations. Although the present disclosure has been described in detail with reference to preferred embodiments, those skilled in the art should understand that the technical solutions of the present disclosure can be modified or equivalently replaced without departing from the spirit and scope of the technical solutions of the present disclosure.

What is claimed is:

1. A method for generating an entity information graph, the method comprising:

acquiring entity information data, and performing information extraction on the entity information data to obtain a triplet;

performing information fusion on the triplet to obtain fused information, and constructing a scoring function and a loss function according to the fused information;

constructing an initial information graph based on the scoring function and the loss function using the fused information, and performing link prediction on the initial information graph; and updating the initial information graph based on a result of the link prediction to obtain an entity information graph;

wherein the constructing an initial information graph using the fused information based on the scoring function and the loss function comprises:

acquiring a data structure of the fused information, performing standardization on the data structure to obtain a standard structure, and updating the fused information using the standard structure to obtain updated fused information;

scoring the updated fused information according to the scoring function to obtain an information score, and sorting the updated fused information according to the information score to obtain an information sequence;

establishing a table by using the information sequence as a column vector and the updated fused information as a row vector, and storing the table in a database by a processor;

setting the database as a knowledge base and calculating a loss value of the knowledge base according to the loss function;

adjusting an information parameter in the updated fused information based on the loss value to obtain adjusted correction information, and replacing the updated fused information in the knowledge base to update the knowledge base and obtain a corrected knowledge base; and acquiring a target association relationship between the updated fused information, and generating the initial information graph based on the target association relationship and the corrected knowledge base.

2. The method according to claim 1, wherein the performing information extraction on the entity information data to obtain a triplet comprises:

structuring the entity information data to obtain structured data;

performing word segmentation on the structured data to obtain an information word;

classifying the information word to obtain a word segmentation category;

performing an association analysis on the word segmentation category and the information word, and determining an association relationship between the word segmentation category and the information word according to a result of the association analysis; and generating the triplet according to the information word, the association relationship, and the word segmentation category.

3. The method according to claim 1, wherein the performing information fusion on the triplet to obtain fused information comprises:

performing feature extraction on the triplet to obtain a triplet feature;

splicing a plurality of the triplet features to obtain a spliced feature; and aggregating the spliced feature to obtain an aggregated feature, and determining the fused information according to the aggregated feature.

4. The method according to claim 3, wherein the aggregating the spliced feature to obtain an aggregated feature comprises:

normalizing the spliced feature to obtain normalized features;

calculating the normalized features and the spliced feature to obtain the aggregated feature using the following formula:

$$A = \frac{1}{|C_i|}\sum_{i=1}^{I} B_i$$

wherein, A represents the aggregated feature, $B_i$ represents an i-th spliced feature, $C_i$ represents the normalized feature corresponding to the i-th spliced feature, I represents a total number of the spliced feature.

5. The method according to claim 1, wherein the constructing a scoring function and a loss function based on the fused information comprises:

randomly selecting two candidate information pieces from the fused information as target information pieces, calculating a similarity between the target information pieces, and obtaining an information association relationship between the target information pieces based on the similarity;

performing feature extraction on the target information pieces to obtain target features, and performing mapping processing on the target features to obtain a mapping matrix;

generating the scoring function according to the similarity, the information association relationship, and the mapping matrix:

$$D = \frac{\exp(E_j \times \tanh(e + r) + \tanh(E_j \times e) + b)}{\sum_{j=1}^{J} \exp(E_j \times \tanh(e + r) + \tanh(E_j \times e) + b)}$$

wherein, D represents a score calculated by the scoring function, $E_j$ represents a j-th mapping matrix, e represents the similarity, r represents the information association relationship, J represents a total number of the mapping matrix, b represents a preset calculation parameter, tanh represents an activation function, exp represents an exponential function; and generating the loss function according to the target features and the scoring function:

$$L = -\frac{l(F_f = 1)}{\sum_f l(F_f = 1)} lbD$$

wherein, L represents a loss value calculated by the loss function, $F_f$ represents a f-th target feature, lb is a log based binary, which is a logarithm with a base of 2, D represents the score calculated by the scoring function, and when an equation in the parentheses of $l(\cdot)$ is true, then $l(\cdot)=1$, otherwise, $l(\cdot)=0$.

6. The method according to claim 1, wherein the performing link prediction on the initial information graph comprises:

acquiring associated entities between the updated fused information in the initial information graph, and determining whether there is an association relationship between the associated entities;

when there is an association relationship between the associated entities, determining that the initial information graph is a normal information graph; and when there is no association relationship between the associated entities, determining that the initial information graph is an abnormal information graph.

7. An electronic apparatus, wherein the electronic device comprises:

at least one processor; and, a memory in communication with the at least one processor, wherein the memory stores a computer program executable on the at least one processor, and the computer program is executed by the at least one processor to enable the at least one processor to implement following steps:

acquiring entity information data, and performing information extraction on the entity information data to obtain a triplet;

performing information fusion on the triplet to obtain fused information, and constructing a scoring function and a loss function according to the fused information;

constructing an initial information graph based on the scoring function and the loss function using the fused information, and performing link prediction on the initial information graph; and updating the initial information graph based on a result of the link prediction to obtain an entity information graph;

wherein the constructing an initial information graph using the fused information based on the scoring function and the loss function comprises:

acquiring a data structure of the fused information, performing standardization on the data structure to obtain a standard structure, and updating the fused information using the standard structure to obtain updated fused information;

scoring the updated fused information according to the scoring function to obtain an information score, and sorting the updated fused information according to the information score to obtain an information sequence;

establishing a table by using the information sequence as a column vector and the updated fused information as a row vector, and storing the table in a database by a processor;

setting the database as a knowledge base and calculating a loss value of the knowledge base according to the loss function;

adjusting an information parameter in the updated fused information based on the loss value to obtain adjusted correction information, and replacing the updated fused information in the knowledge base to update the knowledge base and obtain a corrected knowledge base; and acquiring a target association relationship between the updated fused information, and generating the initial information graph based on the target association relationship and the corrected knowledge base.

8. The electronic apparatus according to claim 7, wherein the performing information extraction on the entity information data to obtain a triplet comprises:
   structuring the entity information data to obtain structured data;
   performing word segmentation on the structured data to obtain an information word;
   classifying the information word to obtain a word segmentation category;
   performing an association analysis on the word segmentation category and the information word, and determining an association relationship between the word segmentation category and the information word according to a result of the association analysis; and
   generating the triplet according to the information word, the association relationship, and the word segmentation category.

9. The electronic apparatus according to claim 7, wherein the performing information fusion on the triplet to obtain fused information comprises:
   performing feature extraction on the triplet to obtain a triplet feature;
   splicing a plurality of the triplet features to obtain a spliced feature; and
   aggregating the spliced feature to obtain an aggregated feature, and determining the fused information according to the aggregated feature.

10. The electronic apparatus according to claim 9, wherein the aggregating the spliced feature to obtain an aggregated feature comprises:
   normalizing the spliced feature to obtain normalized features;
   calculating the normalized features and the spliced feature to obtain the aggregated feature using the following formula:

$$A = \frac{1}{|C_i|} \sum_{i=1}^{I} B_i$$

wherein, A represents the aggregated feature, $B_i$ represents an i-th spliced feature, $C_i$ represents the normalized feature corresponding to the i-th spliced feature, I represents a total number of the spliced feature.

11. The electronic apparatus according to claim 7, wherein the constructing a scoring function and a loss function based on the fused information comprises:
   randomly selecting two candidate information pieces from the fused information as target information pieces, calculating a similarity between the target information pieces, and obtaining an information association relationship between the target information pieces based on the similarity;
   performing feature extraction on the target information pieces to obtain target features, and performing mapping processing on the target features to obtain a mapping matrix;
   generating the scoring function according to the similarity, the information association relationship, and the mapping matrix:

$$D = \frac{\exp(E_j \times \tanh(e + r) + \tanh(E_j \times e) + b)}{\sum_{j=1}^{J} \exp(E_j \times \tanh(e + r) + \tanh(E_j \times e) + b)}$$

wherein, D represents a score calculated by the scoring function, $E_j$ represents a j-th mapping matrix, e represents the similarity, r represents the information association relationship, J represents a total number of the mapping matrix, b represents a preset calculation parameter, tanh represents an activation function, exp represents an exponential function; and
   generating the loss function according to the target features and the scoring function:

$$L = -\frac{l(F_f = 1)}{\sum_f l(F_f = 1)} lbD$$

wherein, L represents a loss value calculated by the loss function, $F_f$ represents a f-th target feature, lb is a log based binary, which is a logarithm with a base of 2, D represents the score calculated by the scoring function, and when an equation in the parentheses of $l(\cdot)$ is true, then $l(\cdot)=1$, otherwise, $l(\cdot)=0$.

12. The electronic apparatus according to claim 7, wherein the performing link prediction on the initial information graph comprises:
   acquiring associated entities between the updated fused information in the initial information graph, and determining whether there is an association relationship between the associated entities;
   when there is an association relationship between the associated entities, determining that the initial information graph is a normal information graph; and
   when there is no association relationship between the associated entities, determining that the initial information graph is an abnormal information graph.

13. A non-transitory computer-readable storage medium storing a computer program, which, when being executed by a processor, implements the following steps:
   acquiring entity information data, and performing information extraction on the entity information data to obtain a triplet;
   performing information fusion on the triplet to obtain fused information, and constructing a scoring function and a loss function according to the fused information;
   constructing an initial information graph based on the scoring function and the loss function using the fused information, and performing link prediction on the initial information graph; and
   updating the initial information graph based on a result of the link prediction to obtain an entity information graph;
   wherein the constructing an initial information graph using the fused information based on the scoring function and the loss function comprises:
   acquiring a data structure of the fused information, performing standardization on the data structure to obtain a standard structure, and updating the fused information using the standard structure to obtain updated fused information;
   scoring the updated fused information according to the scoring function to obtain an information score, and sorting the updated fused information according to the information score to obtain an information sequence;
   establishing a table by using the information sequence as a column vector and the updated fused information as a row vector, and storing the table in a database by a processor;

setting the database as a knowledge base and calculating a loss value of the knowledge base according to the loss function;

adjusting an information parameter in the updated fused information based on the loss value to obtain adjusted correction information, and replacing the updated fused information in the knowledge base to update the knowledge base and obtain a corrected knowledge base; and acquiring a target association relationship between the updated fused information, and generating the initial information graph based on the target association relationship and the corrected knowledge base.

14. The non-transitory computer-readable storage medium according to claim 13, wherein the performing information extraction on the entity information data to obtain a triplet comprises:

structuring the entity information data to obtain structured data;

performing word segmentation on the structured data to obtain an information word;

classifying the information word to obtain a word segmentation category;

performing an association analysis on the word segmentation category and the information word, and determining an association relationship between the word segmentation category and the information word according to a result of the association analysis; and generating the triplet according to the information word, the association relationship, and the word segmentation category.

15. The non-transitory computer-readable storage medium according to claim 13, wherein the performing information fusion on the triplet to obtain fused information comprises:

performing feature extraction on the triplet to obtain a triplet feature;

splicing a plurality of the triplet features to obtain a spliced feature; and aggregating the spliced feature to obtain an aggregated feature, and determining the fused information according to the aggregated feature.

16. The non-transitory computer-readable storage medium according to claim 15, wherein the aggregating the spliced feature to obtain an aggregated feature comprises:

normalizing the spliced feature to obtain normalized features;

calculating the normalized features and the spliced feature to obtain the aggregated feature using the following formula:

$$A = \frac{1}{|C_i|} \sum_{i=1}^{I} B_i$$

wherein, A represents the aggregated feature, $B_i$ represents an i-th spliced feature, $C_i$ represents the normalized feature corresponding to the i-th spliced feature, I represents a total number of the spliced feature.

17. The non-transitory computer-readable storage medium according to claim 13, wherein the constructing a scoring function and a loss function based on the fused information comprises:

randomly selecting two candidate information pieces from the fused information as target information pieces, calculating a similarity between the target information pieces, and obtaining an information association relationship between the target information pieces based on the similarity;

performing feature extraction on the target information pieces to obtain target features, and performing mapping processing on the target features to obtain a mapping matrix;

generating the scoring function according to the similarity, the information association relationship, and the mapping matrix:

$$D = \frac{\exp(E_j \times \tanh(e + r) + \tanh(E_j \times e) + b)}{\sum_{j=1}^{J} \exp(E_j \times \tanh(e + r) + \tanh(E_j \times e) + b)}$$

wherein, D represents a score calculated by the scoring function, $E_j$ represents a j-th mapping matrix, e represents the similarity, r represents the information association relationship, J represents a total number of the mapping matrix, b represents a preset calculation parameter, tanh represents an activation function, exp represents an exponential function; and generating the loss function according to the target features and the scoring function:

$$L = -\frac{l(F_f = 1)}{\sum_f l(F_f = 1)} lbD$$

wherein, L represents a loss value calculated by the loss function, $F_f$ represents a f-th target feature, lb is a log based binary, which is a logarithm with a base of 2, D represents the score calculated by the scoring function, and when an equation in the parentheses of l(·) is true, then l(·)=1, otherwise, l(·)=0.

* * * * *